(12) United States Patent
Afsenius (10) Patent No.: US 7,397,501 B2
(45) Date of Patent: Jul. 8, 2008

(54) DIGITAL CAMERA WITH VIEWFINDER DESIGNED FOR IMPROVED DEPTH OF FIELD PHOTOGRAPHING

(75) Inventor: Sven-Åke Afsenius, Lidingö (SE)

(73) Assignee: AFSENIUS, Sven-Ake, Lidingö (SE)

( * ) Notice: Subject to any disclaimer, the term of this patent is extended or adjusted under 35 U.S.C. 154(b) by 609 days.

(21) Appl. No.: 10/500,590

(22) PCT Filed: Oct. 23, 2002

(86) PCT No.: PCT/SE02/01934

§ 371 (c)(1),
(2), (4) Date: Jun. 30, 2004

(87) PCT Pub. No.: WO03/067323

PCT Pub. Date: Aug. 14, 2003

(65) Prior Publication Data

US 2005/0068454 A1  Mar. 31, 2005

(30) Foreign Application Priority Data

Jan. 15, 2002 (SE) .................................. 0200097

(51) Int. Cl.
*H04N 5/225* (2006.01)
*H04N 5/228* (2006.01)
*H04N 1/46* (2006.01)
*H04N 5/232* (2006.01)
*G06K 9/32* (2006.01)
*G03B 13/00* (2006.01)

(52) U.S. Cl. .............................. 348/218.1; 348/208.13; 348/345; 358/540; 382/294

(58) Field of Classification Search .............. 348/208.6, 348/218.1, 345, 349, 354, 355, 356, 208.13; 358/540; 382/255, 284, 294
See application file for complete search history.

(56) References Cited

U.S. PATENT DOCUMENTS

| 4,693,577 | A | * | 9/1987 | Sasagaki et al. ............. 396/384 |
| 5,307,170 | A | | 4/1994 | Itsumi et al. |
| 5,511,155 | A | * | 4/1996 | Yamaguchi .................. 382/255 |
| 5,920,657 | A | * | 7/1999 | Bender et al. ................ 382/284 |
| 6,075,905 | A | | 6/2000 | Herman et al. |
| 6,259,080 | B1 | | 7/2001 | Li et al. |
| 6,320,979 | B1 | * | 11/2001 | Melen ......................... 382/255 |
| 6,445,415 | B1 | * | 9/2002 | Olsson ........................ 348/345 |

(Continued)

FOREIGN PATENT DOCUMENTS

JP       2006279940 A   * 10/2006

*Primary Examiner*—John M Villecco
(74) *Attorney, Agent, or Firm*—Albihns AB (57) ABSTRACT

The present invention aims at depth or field improvements or digital cameras, where differently-focused images of a scene, to be photographed, are exposed. A final image is produced from these primary-shots, where depth of field-limitations related to classic photo-lenses, are essentially eliminated. Specific new problems related to camera-viewfinders and camera-focusing are emerging however, due to the increasing number of images being registered. Following the present invention, advantageous procedures regarding camera viewfinders, for visualizing the individual primary shots as well as images processed for improved depth of field, are outlined. A simple technique for upgrading a standard digital camera for depth of field-improvement operation, including an adequate method for preselecting focuses, is illustrated by FIG. 5. These problems and others, related to a photographers adjustments and handling of various kinds of depth of field-enhancing cameras are remedied by applying the present invention.

15 Claims, 5 Drawing Sheets

U.S. PATENT DOCUMENTS

| | | |
|---|---|---|
| 6,466,253 B1 | 10/2002 | Honjoh |
| 6,466,618 B1 | 10/2002 | Messing et al. |
| 6,940,555 B2 * | 9/2005 | Okisu et al. .................. 348/345 |
| 6,975,352 B2 * | 12/2005 | Seeger et al. ............. 348/218.1 |
| 2001/0002216 A1 * | 5/2001 | Chuang et al. .............. 382/255 |
| 2001/0013895 A1 * | 8/2001 | Aizawa et al. .............. 348/345 |
| 2002/0075389 A1 * | 6/2002 | Seeger et al. ................ 348/222 |
| 2002/0181762 A1 * | 12/2002 | Silber ......................... 382/255 |
| 2003/0071909 A1 * | 4/2003 | Peters ........................ 348/349 |
| 2004/0080661 A1 * | 4/2004 | Afsenius et al. ............. 348/345 |
| 2004/0130649 A1 * | 7/2004 | Lee ............................. 348/345 |
| 2005/0212952 A1 * | 9/2005 | Triteyaprasert et al. ..... 348/345 |
| 2007/0126920 A1 * | 6/2007 | Lee ............................. 348/345 |
| 2008/0079839 A1 * | 4/2008 | Sung et al. .................. 348/345 |

\* cited by examiner

DIGITAL CAMERA WITH VIEWFINDER DESIGNED FOR IMPROVED DEPTH OF FIELD PHOTOGRAPHING

BACKGROUND OF THE INVENTION

A depth of field-improving system where differently focused photographic images of one and the same scene are being registered thereafter combined, is known from a previous patent PCT/SE01/02889. Digital registration in particular, makes it feasible to obtain pictures featuring sharp definition from extreme proximity distance up to infinity, more or less. Other options, referring to the same patent, are described as well. Its possible, according to the same invention, to execute separate exposures, one after another, with intervening range adjustments of the camera lens. However, practical circumstances make it more advantageous in certain cases to perform these exposures simultaneously, for example by using beamsplitters.

PRIOR ART AND ADJACENT TECHNIQUES

Cameras with viewfinders, intended for image registration on durable media (thus pictures of considerably longer life span than at real-time presentation) and with a dedicated depth of field-improvement function, thus involving image processing of differently-focused images and programmed automatic setting of focal ranges (i.e. preselected states of focus) during the process of exposure, seem to constitute a novel art.

The problem of improving a cameras depth of field is however as old as the camera itself and different methods have been suggested:

U.S. Pat. No. 5,307,170 is describing a video camera which registers differently-focused images by means of a periodically vibrating image sensor, using some segmental- or filter method (cf PCT/SE01/02889) for extraction of high frequency image information from such image-cycles, for synthesis to resultant images with extended depth of field.

Measurement of image resolution is, as far as can be gathered from the description, performed by means of some kind of Autofocus (AF) procedure. The whole arrangement is described as a Video-camera with improved Auto-Focus and ability to catch up with fast moving objects. An automatic movement detection function, by means of which intruders can be automatically detected, is furthermore described and it's outlined how a mobile robot may thus detect and avoid obstacles. The method can therefore, according to the patent, be used for separation of mobile objects from its background. The course of events may be followed on an image monitor screen. The applications cited are apparently restricted to video camera homing of fast missiles, where the normal Autofocus function is too slow, plus automatic detection of intruders. Alternative methods for extracting image information from differently focused images are known from the other above-mentioned patent (PCT/SE10/02889), however this selective process may not necessarily be associated with high frequency image information (extensive image parts may almost lack such information) but rather by using other image information like some optimal similarity vs a comparison- or template image, produced by other means. This other technique may for example consist of (at least) one single exposure executed with very high F-number (Like F/32), thus an image registered with considerable depth of field. The amount of light exposed, will be very much reduced with such a small aperture, which however may be compensated for, by using longer exposure time and by increasing sensor sensitivity. The exposure time may only be extended up to a certain limit (say $\frac{1}{15}$ second) using free hand photography of scenes with mobile objects, while the sensitivity may be increased to such an extent that pictures become so noisy, i.e. 'grainy', that the result may not reach the standard for an acceptable photo, however nevertheless suffice as template picture, following the above-mentioned technique, and this procedure is also applicable when merging several exposures at reduced aperture. The above-mentioned template method is also suitable for iterative procedures including successive improvement of templates, produced by means of various techniques. Pictures registered in wide-angle mode, i.e. with reduced focal length and larger field of view, is providing another alternative technique (partly described in U.S. Pat. No. 5,920,657). Such pictures may then, by electronic means (electronic zoom) be enlarged to the same format and field of view, as another picture registered at longer (telephoto) focal distance. This enlarged wide angle picture has an improved depth of field but suffers from reduced image resolution (number of pixels) at the same time, as compared to the corresponding picture registered with longer (tele) focal length, thus most likely (again) not entirely satisfactory as resultant image but nevertheless useful as a template image.

These two latter techniques are thus examples of how to produce template images according to the depth of field improvement technique outlined in patent PCT/SE10/02889, where extraction of (spatially) high frequency image signals are not used as technique.

A new sensor with several parallel registration-levels arranged in depth, i.e. arranged so that at least two differently-focused images can be detected, is also suggested in the same patent and this procedure eliminates the need for vibrating sensors (cf above) as well as beamsplitters (cf below). An image-sensor sharing certain of these characteristics (however for a different purpose), is described by the company Foveon (http://222.foveon.com/X3_tech.html; Feb. 17, 2002), as applied to a camera SD9 from the company Sigma (http://www.photo.net/sigma/sd9). The purpose was here to separate the detection of three main colours RGB into three separate image planes on top of each other. These sensor-planes thus being apart but so tightly stacked that their focuses are practically the same.

PURPOSE OF THE INVENTION

Certain conditions and requirements apply to a camera featuring the above-mentioned depth of field-improvement technique. First of all, a viewfinder mounted sideways apart from the objective lens will experience a variable parallax, being large for nearby objects and none at all for objects very far away. Such a finder is therefore not suitable—at least not at close distance. We are therefore confined to bringing viewfinder-images through the camera objective lens.

Secondly, there are partly contradictory requirements applying to a viewfinder image. On one hand, there is some need for a finder image to exhibit reasonable affinity (though possibly of reduced quality) to the resultant merged picture. But on the other hand, there is also a need for focusing each individual picture, being recorded at various range settings. It's a purpose of the present invention to solve these problems. A complete separation of the viewfinder from the image registration function is also hard to achieve, considering the fact that the objective is the common source for both. It's thus a further purpose to accomplish a digital camera with viewfinder function as well as facilities for exposure and setting of focal range.

SUMMARY OF THE INVENTION

This invention is comprising the function of such a camera-viewfinder, or to be more precise, arrangements and procedures aiming at improvement of focusing, picture composition and focal range distribution for a so-called depth of field-enhancing camera. The invention is thus applicable for electronic cameras, generally registering several differently-focused pictures of the scene being projected. Electronic image-processing may provide means for selecting such image portions or segments from these differently-focused pictures, being in the most optimal states of focus, thereafter assembling these parts for a resultant image with better depth of field than either of the original pictures. A camera must be aimed at the scene to be photographed and a viewfinder is usually called for in order to accomplish this. For sure, a 'free hand' aiming procedure may be chosen by a photographer on certain occasions, but precision and image control is correspondingly reduced by that. The viewfinder makes it possible for a photographer to monitor the depicted scene, usually through an eyepiece or watch an image screen directly without magnifier. The viewfinder facilitates control of image composition and focusing. It may be an optical viewfinder, meaning direct optical projection without electronic registration, usually through some telescopic constellation consisting of objective lens, ocular and diffuser plate. Or the finder may be electronic, meaning that the picture is registered electronically by a sensor (like CCD, CMOS). Even the electronic viewfinder might include optics, like the projecting objective lens and sometimes magnifying eyepiece and other optical elements. An instrument- or camera viewfinder may well be regarded as an optical device on its own merits (cf above-mentioned application PCT/SE10/02889). It is however not operated on its own, rather constitutes a subordinate part of the main instrument, this being motive for a separate description. A 'Viewfinder' is, according to the present text, a device being attached to or being integrate part of a camera, presenting (for the photographer) the scene to be registered. This finder is an optical aid when performing permanent registration of images, i.e. for image-composition and focusing. Such recording is presently taking place on lasting media like photographic film, magnetic tape, memory cards, computer harddisks, CD and DVD disks.

Other cases where projection-optics may be found, but instead the main purpose is immediate observation, do (by definition here) not involve viewfinders: Devices like observation telescopes, surveillance monitors and sights may apply to these contexts. Such screens and telescopes are used, more or less, for passive display of real-time courses of events. Sights, on the other hand, are being used for active aiming of weapons and other devices against specific objects or 'targets'. These latter devices, designed for (near) real-time image representation, should feature imaging of best possible quality (Cf the above-mentioned U.S. Pat. No. 5,307,170 patent), while a viewfinder image, on the other hand, must not necessarily represent such optimal system resolution: It's not a matter of final result in this latter case, just an image of work, which has to be good enough nevertheless, so that image composition and (occasional) focusing may be accomplished flawlessly.

Functional control of a (main) instrument with depth of field-improving features (as described in patent PCT/SE01/02889 above) brings about special viewfinder properties. Or to be more specific, it's here to be demonstrated, that a camera with capacity to produce depth of field-improved pictures from differently-focused original exposures of one and the same scene, should also benefit from a viewfinder with similar depth of field-enhancing properties. The absence of such a viewfinder renders simultaneous observation (without time-consuming refocusing) of scene-objects with widely varying distances from the camera, more difficult. It's becoming increasingly impractical to select, compose and control a scene to be photographed without such a finder and where instead frequent refocusing of the viewfinder must be resorted to. Experiments and optical theory about depth of field confirm that a traditional viewfinder, according to prior art (cf below), simply can not depict a depth of field-improved camera picture with all it's details, because the finders depth of field is insufficient.

Survey of Specific Problems Associated with Depth of Field-improving Cameras

EXAMPLE

A nature photographer wants to take a photo of an ant at 4 centimeters distance, and of an ant-hill 10 meters from the lens: He can't even see that Ant-hill through the traditional viewfinder, when having focused on the foreground ant. Or vice versa with the finder focused on the far away Ant-hill, he can't see the ant or even tell if the ant is still there, part of the scene; It might as well have walked out, away from the field of view.

Figure 1:
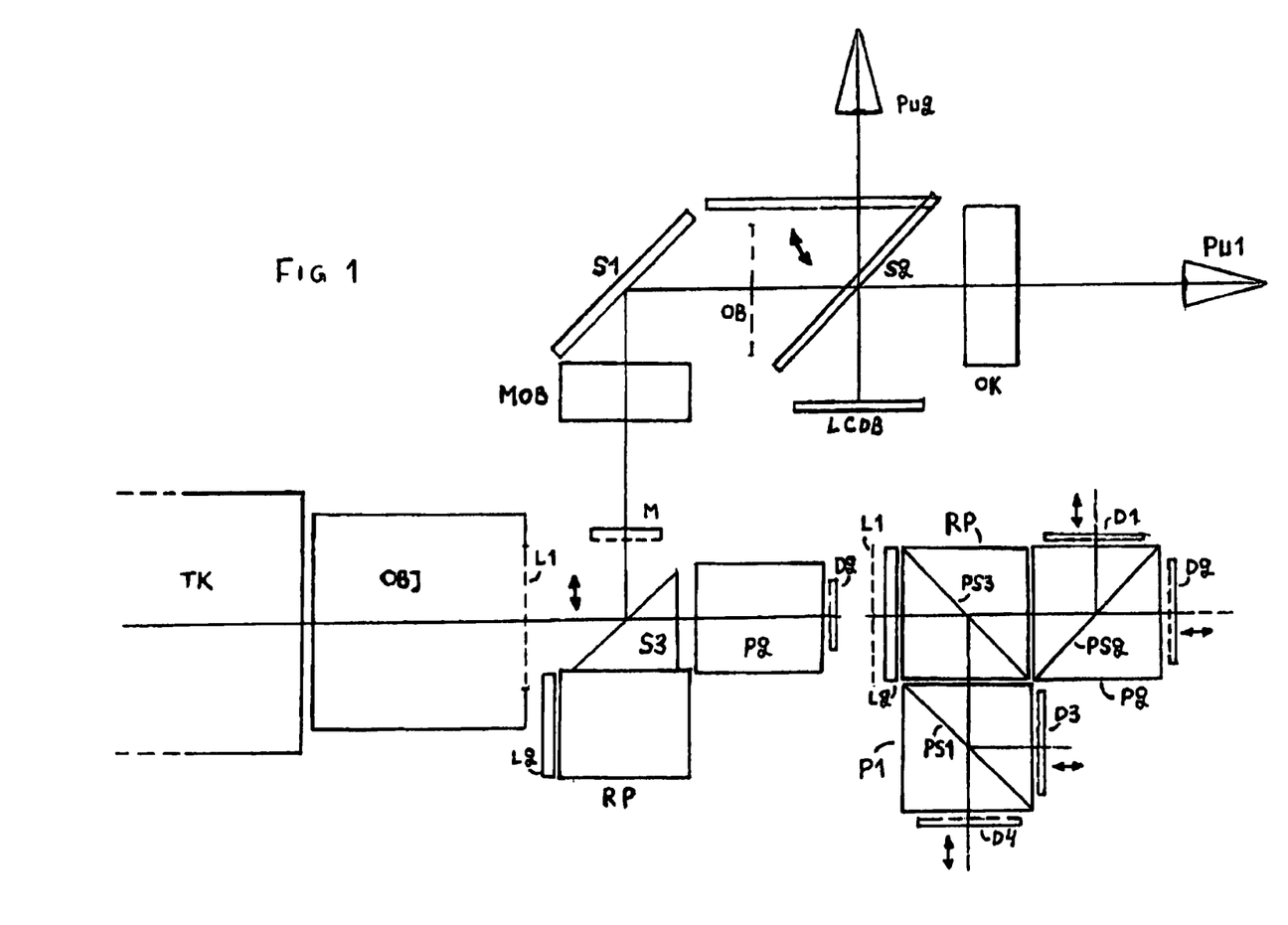
FIG. 1 shows a depth of field-improving camera design, including the viewfinder.

Successful operation, at desirably high speed, of a depth of field-improving camera, may thus be dependant upon an associated viewfinder, improving the depth of field, however not necessarily presenting pictures of same high image quality as the registered (exposed) pictures. The viewfinder pictures should, on the other hand, be presented in a (near) real-time mode, even for a still camera, rendering feasible, viewfinder-control of fast moving objects within a scene. This depth of field-extending viewfinder for a still camera must therefore be in continuous operation, even while the camera itself remains passive, i.e. when no pictures are being registered. There is thus a principal distinction inbetween the electronic viewfinder and the image registration of a camera, even where a common sensor is being used. Refocusing modes, as regards depth of field-improvement methods, being disclosed in the PCT-patent, mentioned above, have the same principal relevance for the viewfinder. It should be pointed out however, that the application example, as illustrated by FIG. 1 in the same patent, with at least two image sensors and (almost) simultaneous exposure at differently-focused image planes, physically separated by means of a beamsplitter, does not require any fast-moving components, this constituting an advantage for continuously operated electronic finders. The viewfinder image may be regarded as a transient 'working-image' rather than the final result, thus hardly calling for maximum performance as regards depth of field.

For example, reduced electronic processing times apply for viewfinders with less number of pixels registered or where the number of differently focused original exposures participating in the process, are reduced: This might indeed introduce some extra image blur at certain object distances, however not to an extent of hindering image composition control. Simplified image processing, like pixel by pixel averaging of differently focused original exposures is another option, possibly reducing image contrast and introducing minor edge-disturbances (generally called artifacts) to the picture. This might seem unacceptable for a resultant still photo, however does hardly disturb the photographer while working and may thus be tolerated. Such a reduction of processing-time favours the (near) real-time function-mode of an electronic viewfinder.

Development of electronic viewfinders is presently fast, moving in a direction of resolution-improvements, however an additional optical finder is still in great demand among photographers, due to the realistic picture-qualities and high resolution of such a device. Electronic image processing, aiming at depth of field-improvements seems, by definition, not relevant for such an optical finder, due to the presence of photons rather than electrons in said unit. This limitation is however compensated by another effect which stems from the human pupil reaction: An eye, interacting with the optical viewfinder of a camera, has an aperture of around 7 millimeters at the most but is mostly confined to something like 2 millimeters in good illumination, which sets a limit to the viewfinders relative aperture, even where the optical viewfinder happens to have larger aperture. This stop down has an effect of improving depth of field. The human eye has furthermore an eminent and automatic ability to refocus, i.e. accommodate from about 20 centimeters reading-distance up to 'infinity', which implies another defacto depth of field-improvement. Anyone can convince himself about the validity of this principle by looking through some magnifying telescopic viewer, where an effective depth of field of from at least 2 meters up to infinity should be observed with 3 times magnification, which might correspond to some viewfinder concurrent with a minor tele lens. The optical viewfinder takes the precedence in this aspect of depth of field, over the electronic viewfinder, which latter neither includes moderating aperture reduction nor accomodation of the photographers pupil. There is an important reservation however: The concept implies that no diffusive glass plate has been located at the image plane of the viewfinder. The full-aperture objective lens will project an image on such a focusing (ground-glass) screen. This image projection will thereby associate with a minimal depth of field, being more suitable for adequate manual setting of focus. Such a diffusive focusing screen inserted in the ray path will thus reduce the optical viewfinders depth of field to about the same level as the electronic viewfinders, implying an obstacle for composition of pictures with inherent large depth of field. Composition of depth of field-improved images may thus expediently be performed without such a diffusive plate: The ocular depth of field may thereby be extended from a meter up to infinity, however this does not imply the similar depth of field regarding individual pictures being registered, where (on the contrary) a depth of field interval of—say—less than a meter may occur for individual photos, exposed through a powerful telephoto lens.

EXAMPLE

The press photographer is standing at an airport expecting a bishop to disembark an airplane, followed by a scantily clad scandal beauty. The november dusk is grey however and the picture must be taken with a powerful tele-lens, without flash light, at full aperture F/2.8 and from 20 meters distance. The interval of useful image resolution is estimated from 18 up to 22 meters. The picture value is associated with the immortalizing of these two celebrities on the same picture, but the 'natural' depth of field does not suffice because the 'beauty' is estimated to emerge up to 5 meters behind the bishop. However, the photographer being prepared for this eventuality, has brought his depth of field-improving camera with, and is planning for a sharp image within a distance interval of 20+/−25%, i.e. 15-25 meters, by means of Interval bracketing (cf below). So he sets the depth of field-selector for the above-mentioned interval. The optical viewfinder of the camera works coaxially through the camera lens: He is next adjusting the focus, towards the front of the reception committee (about 20 meters distant), with the (diffusive) focusing screen inserted, thereafter folding away the same focusing screen. The photographer may now, in a relaxed mood, continue his image composition, for example by means of zooming, as observable through the optical finder—and then await the right moment for taking his pictures.

The above-mentioned depth of field-improvement technique with an optical viewfinder without focusing screen, may prove adequate for most press-photographer missions, but may nevertheless turn out as being completely useless when practising macro photography with very short proximity distances involved. (as exemplified by the Ant and Ant-hill case above)

It's then possible to relapse into various strategies of merging differently focused images, as described in patent PCT/SE01/02889 and further below in this text.

The most elementary finders are aiming devices without optical components (exemplified by Victor Hasselblad AB's camera 500C/M with the #40215 device), and secondly optical viewfinders in parallel with the camera lens, frequently occurring on simple fixed-lens cameras (A classic example being the Kodak Instamatic camera). The drawback of these two approaches is the parallax inherent at close range. Attempts to solve this problem by means of adjustable search-frames have been launched (Hasselblad XPAN and Leica CL/M), however of little use when practising photography with considerable depth of field, mainly due to the fact that only one object distance at a time may be compensated for, i.e. the method lacks capacity to correctly represent the depth dimension of a scene. Another shortcoming of the separate optical finder, is its incapacity to adequately represent various magnifications, i.e. fields of view, when zooming. These drawbacks are particularly annoying when exercising close range macro photography, a frequently occurring application mode for depth of field-improving cameras. However the exit pupils of independent optical viewfinders are usually small, focusing screen lacking, and this amounts to depth of field improvements. Even such viewfinders do therefore qualify as depth of field-improvers. The simplest viewfinders of that kind, without intermediate image-plane, thus lacking diffusive focusing screen, is the compact low-magnifying so called Dutch telescope with positive objective lens and a negative ocular, without image inversion, nor optical components for such purposes.

A common way to avoid the above-mentioned parallax problems is to arrange for an optical viewfinder together with, and usually coaxially with the camera lens, however locating a part-transparent or folding mirror behind, separating the viewfinder image from the picture(s) to be registered by emulsion film or electronic detectors. The parallax problem is thereby eliminated and the viewfinder duplicates the registered view, i.e. shows the various fields of view and magnifications generated by focal-distance zooming, as long as the beamsplitter has been located behind the camera lens. This arrangement makes a simple separation of lens from camera feasible, i.e. lenses may be exchanged without influencing the viewfinder function: Such single-lens reflex- or system cameras are more complicated than cameras with the above-mentioned simple viewfinders, thus more expensive, however being more satisfactory, due to the simple fact that a photographer may now always and with high precision observe the composition of the resultant picture.

The second arrangement, using electronic viewfinders, is feasible for still photo- and video-cameras with electro-optical detection (like ccd-sensors), and where an electronic viewer is creating (near) real-time pictures. 'Movie-images' are thus created on a viewfinder screen, similar to a TV- or video representation, sometimes being an LCD (liquid crystal screen), otherwise a so-called micro-displayer. Most video cameras have such viewfinders, for the obvious reason that video-film is created anyway, making such a viewfinder presentation easy to accomplish.

This is also a common arrangement among still photo cameras, however usually with an image resolution exceeding what can be observed through the viewfinder and manual focusing is thereby rendered more difficult. This shortcoming is even more accentuated, whenever the electronic image is shown without magnifying glass, a nowadays common feature among digital still photo- as well as video-cameras. It's true that a general selection of motive is facilitated by such a procedure, but manual focusing is hampered by the simple reason that the electronic screen must be viewed from sufficiently far distance, where an eye can accomodate. It's furthermore an image of relatively low intensity for outdoor use in sunshine, an illustration being the C-3000 zoom digital camera from Olympus Optical Co (Japan) having two viewfinders: A separate optical one and an electronic (LCD) without magnifier. The DCR-VX1000E video camera from Sony has one electronic viewfinder only: A micro-displayer being viewed through a magnifier. Methods aiming at depth of field-improvements, based upon availability of more than one differently focused image, depicting the same scene and applicable to electronic or optical viewfinders, are disclosed in a Swedish patent application #0004836-3, being brought further in the subsequent, previously mentioned PCT patent WO 02/059692, from which selected aspects will now be discussed:

The simplest procedure, relevant for a viewfinder image, created by electronic means, is apparently some pixel-by-pixel averaging of the differently focused images involved. However, the Average-image (M) contrast will be reduced due to inclusion of focused as well as out-of-focus image-information: The unfocused image-components are usually settling upon the final image like a haze (noise), which is hardly acceptable for a resultant image, but might nevertheless pass for a view-finder, particularly when considering the associated fast image processing and moderate computing-capacity needed. The average-image method may be further developed, according to another more sophisticated and resource-consuming mode, where an essential part of the above-mentioned image haze from un-focused information is extracted from the Average-image so that contrast and image quality is bettered. A further improvement may be accomplished by means of introducing a simple segment-selection method, even though certain disturbances along edges may emerge, however this being of less consequence for sequences of changeable images rather than still photos.

Figure 3A:
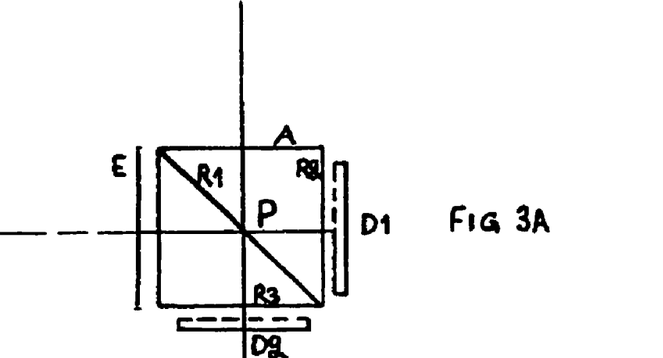
FIG. 3A-D exhibits further examples of beamsplitter arrangements for a camera with finder and with depth of field-enhancement capability.
Figure 3B:
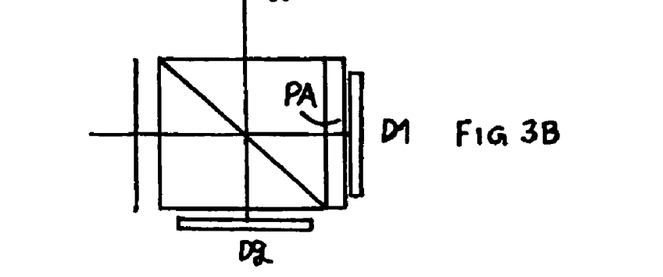
Figure 3C:
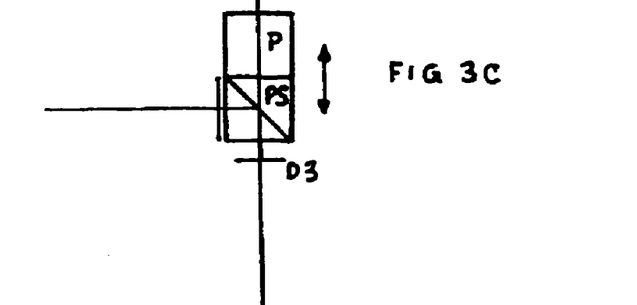
Figure 3D:
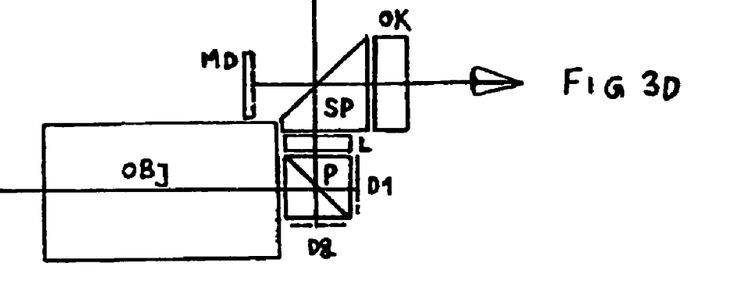

Superposition of differently focused images is even feasible for an optical viewfinder, again ending up with weakening image contrast due to contributions from in-focus as well as out-of-focus image information, however still a potentially useful viewfinder application. One mode is to split the wavefront or aperture in at least two parts, then introduce different states of focus for these ray paths, by optical means, and finally perform an optical reunion of the two parts into one image, constituting a superposition of differently focused contributions (FIG. 3b).

Another and now time-related method is to introduce periodic change of focus, so that differently focused pictures alternate fast enough (ca>=10 Hz) in order to create an illusive impression of images being merged for an observer, like what's happening when watching video or movies. These above-mentioned methods, related to optical viewfinders, are here to be regarded as depth of field-improving techniques. The one camera viewfinder function is thus control of and—where applicable—manual setting of focus. This is furthermore repeated several times when operating a depth of field-improving camera with several focal planes to be focused upon.

This is a relatively tedious, but in some cases acceptable process, when photographing static scenes more or less, and where optimal focusing of specific objects has priority. It's here to be named the 'Manual focusing mode'.

The depth of field-improvement process may, according to another notion, be regarded as a joint action of several differently focused pictures put together, so that a more or less continuous succession of field of depth-intervals are added to each other. There is thus emerging a question about how an optimal distribution of these focuses should look like. This may—following known theory—be calculated with some optical computer program.

EXAMPLE

Let's say the digital camera focal length is f=20 mm with a relative aperture F/2.8 and where the aim is to have a depth of field-interval from the horizon down to shortest possible proximity. Furthermore assuming the optimal axial image resolution to be equivalent to a RED(75%)=0.03 mm while the image definition must nowhere exceed RED(75%)=0.07 mm within the chosen interval (RED is the radial energy distribution). The interval of acceptable image resolution will then depend upon the number of differently-focused exposures of the sequence involved, or (below) the number of sensors, following a beamsplit method:

TABLE 1

| Number of sensors | Depth of field (distance-interval) |
|---|---|
| 1 | 4.5 meters-∞ |
| 2 | 2.3 meters-∞ |
| 3 | 1.5 meters-∞ |
| 4 | 1.1 meters-∞ |

Another table, showing the range of focus for each of these sensors and the effective depth of field mastered by each sensor, may similarly be calculated. This constitutes an example of optimal distribution for object-distances in focus, and a depth of field-improving camera with a f=20 mm lens

TABLE 2

| Sensor Number # | In-focus Object Distance | Depth of field interval |
|---|---|---|
| 1 | 8 meters | 4.5 meters-∞ (infinity) |
| 2 | 3 meters | 2.3-4.5 meters |
| 3 | 1.8 meters | 1.5-2.3 meters |
| 4 | 1.3 meters | 1.1-1.5 meters |

It's thus apparently easy, following established optical theory, to calculate those object distances answering to the most evenly distributed image resolution, over a certain interval. However, this distribution is determined by circumstances under which the differently-focused images were exposed, or specifically the total (object) distance interval (like from 20 cm up to infinity), the number of frames (like 3) being exposed within this interval, the focal distance/magnification chosen (like a f=60 mm telephoto lens for digital camera) and finally the relative aperture in use (like F/2.8); Few exposures, long focal lengths and large apertures are reducing the useful depth of field. The photographer may therefore have some good reason to decide about the depth of field-interval within which he is interested to operate. This may be done by using an Interval-Selector. Or to be more specific: There may be good reasons to avoid focusing at distances closer than those objects he intends to compose into the picture, because the sensors have to be located near each other there (cf table #2 above) and the selective image processing is rejecting such segments nevertheless. It may therefore frequently turn out practical for the photographer (while performing his initial picture composition) to focus upon the nearest object of the scene and 'lock' the proximity distance there, using a Proximity-Distance Selector. This may involve an autofocus procedure, however some photographers may still persist in using manual focusing in order to secure better control. Axial movements of an image-projecting lens, individual parts of it, or the image sensor, may effectuate sequential refocusing or it may be done with some optical element introduction, like inserting glass-plates in the ray path, thus altering the optical length, causing the image-planes to switch. Using more than one (differently-focused) detector, a mirror element may be moved in or out of the ray path so that image registration can alternate from one sensor to another, or a part-transparent/reflecting mirror element may allow simultaneous registration of several pictures to take place. These methods can be combined.

The need to monitor, control and perform the above-mentioned close-range focusing and furthermore to scrutinize the depth of field at close range and further away, is creating a need for individual evaluation of the proximity picture to be registered. The above mentioned viewfinder-capacity to improve depth of field must therefore be switched off, when need arises, replacing the finders processed and merged view with individually focused primary-images instead.

The implementation of this might involve some push-button procedure where a finder-view of preference, like one of the four individually focused images of table 1-2 (above), may be chosen by means of 'clicking', however with an optional return at any moment to the above-mentioned composite image, with extended depth of field.

This mode of locking on the closest range will here be called 'Proximity-Bracketing', including a subsequent and automatic setting of image-focuses, in order to achieve an optimal distribution, following the principles outlined for the Tables (above). This automatic refocusing may consist of axial movements of individual image sensors, where motion-generating motors, piezoelectric actuators etc are effectuating the movements, being under control of an electronic device which calculates, or stores in memory (or both) all possible sets of optimal focusing distributions for the system. This Proximity-Bracketing mode may thus be classified as semi-automatic, involving one focusing operation only, namely towards a nearby object, after which the rest of the focusing is done automatically. It may, according to another notion, be regarded as a depth of field high-pass filter. An analogous low-pass filter would of course be feasible as well.

Another semi-automatic mode, already mentioned (in connection with the 'bishop and the scandal beauty' above) is the 'Interval Bracketing' method involving choice of and focusing on a priority-object (Sensor or image detection P), using an (optimal-) Focus-Selector and furthermore setting a (depth of field-) Interval-Selector for an object distance interval (around the same object), within which an acceptable depth of field is required: The shorter interval limit may for example correspond to a distance/sensor P− while the farther limit corresponds to another P+. Thus a photo with acceptable image resolution will emerge inside the object-distance interval $$P-<P<P+ \qquad (1)$$

And this constitutes a depth of field Band-pass filter according to an alternative notion.

A purpose with this method is thus to solve the prevalent press-photography problem of today, where the aim is to simultaneously focus upon two laterally (i.e. sidewise) nearby, however in depth more separated objects, like portraying two persons. The trick of compressing such a scene in depth, by using a strong telephoto lens, is commonly shared standard art among photographers. However, a reduction of depth of field is the side-effect, leaving only the priority-object in sharp focus while other in depth-deviating objects remain blurred more or less (as being evidenced almost every day by the daily press). Interval Bracketing shows close affinity to the present day procedure, which press-photographers are used to: Setting a Manual- or Auto focus against an object of priority, through the finder, and then make the shot as usual, the only difference being a preselection of desired depth of field, like +/−5 meters which corresponds to +/−25% at 20 meters range.

Even this is a semi-automatic method, with manual selection of priority-focus and depth of field interval, while other focal conditions are set automatically by means of an electronic control, essentially described already under the title 'Proximity Bracketing' above.

Another procedure involves some continuous 'automatic' priority-focusing by means of an Autofocus-procedure (prior art), usually aiming with the camera finder against the object chosen, however otherwise same technique as already outlined.

Regions outside the bracket-interval may also be set even more out of focus, following a conceptionally similar but, as to the effect, dramatically deviating method. The image definition will thus deteriorate even further outside this interval (1) above. The effect is achieved by means of a negative segment-selection process, being described elsewhere as a depth of field-reduction method (patent PCT/SE01/02889); Image information outside the depth of field bracket interval is thereby suppressed, making visual for- or background disturbances less obtrusive. 'Special effects' may also be created. Objects in focus within the selected interval will on the other hand exhibit increasing contrasts from its high resolution against a blurred surrounding: It's an advantageous method for electronic finders, where this effect may enhance objects to be focused upon and may also aid a photographer in concentrating his attention to vital image-parts of priority, during image composition. Another procedure: The most prevalent or (according to some other criterion) otherwise preferred focal states within a scene, are automatically identified and selected, the image registration thereafter taking place, observing the same states of priority. This latter may be the result of an Autofocus scan, where best focus is measured at certain positions over the field of view, which may also be divided into segments according to a further development of this mode, where the same measurement is now taking place in each individual segment.

And finally, there are fully automatic methods, aiming at a more stereotyped distribution of focuses according to some standard procedure, as optimal as possible within a given interval. This is a variety of the Proximity-Bracketing mode (above), however differing in that the closest distance is preselected. The advantage of this mode is speed because no 'thinking' is necessary. The reaction time is fastest possible because no camera settings whatsoever are called for, not even the reaction time for an Autofocus (normally about ½ second) is detaining the exposure. There is an objection that this method is rarely optimal for a specific scene. On the other hand, the common problem of a failing Autofocus, where the lens is focused at the wrong distance, for instance because of an aiming error with the finder, is now avoided. This method is therefore particularly suitable for amateur photographers of the general public, where simplicity and reliability are at premium. Our name for it is the 'Standard focusing method', not to be mixed up with some Autofocus mode, which in a sense is the very opposite of it. Several of the above-mentioned beamsplitter examples call for 3 or even 4 image sensors. A simple estimate tells that each sensor will then receive only ⅓ or ¼ of the incident light at the most, the latter answering to two steps of Aperture reduction, which may be to disadvantage in a gloomy environment. The alternative is sequential exposure while refocusing and with one sensor only, which is certainly giving full illumination from the lens all the time, however must be done fast enough in order to avoid motion blur. Not least press-photography of fast-moving courses of events may suffer from this. There are instances however where a photographer is satisfied with (for example) two distinct focuses only, like when portraying two persons against a heavenly background and where no significant details appear at intermediate distances. A need for optimal focusing of these two priority objects will then emerge. Only two image sensors are required in this case, other sensors might as well be inactive. Advantages with this arrangement include fast image processing and fewer exposures/sensors needed. The above-mentioned problem with light reduction may persist however. This situation may be improved upon by linking up the reading of sensors as follows (example):

Assume there are 4 image sensors available while (cf above) only two differently focused images are required. The sensors may then work as couples, i.e. the electronic registration from two sensors, focused for identical object distance, are connected. The two other sensors being differently focused are similarly coupled. The luminous flux generating an image of a certain state of focus is thereby doubled which—true—is not the same as to double the sensor sensitivity, yet the improvement will be significant and this pixel-by-pixel addition of images will also decrease the spatial noise, being different for the two sensors, and picture quality will increase correspondingly.

Referring to the mode of Interval Bracketing (cf above) and another 4-sensor design, it would be possible to join two sensors for registering the priority (middle) state of focus (P) and thereafter register the interval ends (P− and P+) with one sensor each. This will give us a better registration of priority focus, thanks to the doubling of the sensors, however the relative intensity from the three pictures must be electronically adjusted in order to obtain same average intensity.

No doubt, there remains a multitude of other practical ways to elaborate these focusing- and sensor-strategies but a further variative account of the same topic would hardly add much of new principles to this text. The examples given are illustrating the principles of the present invention, but do not confine the scope to that. 'Camera' and 'Digital Camera' with "Viewfinder" are denominations common in this text as regards the invention, but it should be emphasized that the invention is equally applicable to video-, surveillance-, lowlightlevel-, and TV-cameras plus Image-intensifier- and Infra-red cameras, just to mention a few other examples of instruments which may be focused, which may have finders and which are meant for permanent image registration, being suitable for a depth of field-improving technique.

DESIGNS EXEMPLIFIED

FIG. 1 exemplifies a depth of field-improving camera with optical and electronic viewfinders, all having the capacity of extending depth of field, according to the invention: Simultaneous registration of up to 4 differently focused images is possible according to this set-up, using the four sensors D1, D2, D3 and D4. The split into different pictures is effectuated by means of the right-angled beamsplitter prisms RP, P1 and P2, where the mirroring surfaces are PS1, PS2 and PS3. These prisms are by preference made of light-weight glass with high refractive index, in order to shorten the optical path through them. Such beamsplitting might be arranged by using many other kinds of prism- and mirror configurations (like involving some kind of Pechan prism), some of them with even shorter optical ray paths. However we have here gone for this simple and illustrative example which is furthermore offering identical ray paths for the four images, as far as optical correction is concerned. Better-quality cameras with beam splitters and several sensors are available on the market (like the so-called 3 ccd video cameras), however the purpose is differing there. A camera lens [OBJ] will rarely perform with its sharpest image resolution at close range and there is furthermore a practical limit as regards sensor movements: The sensors are here focused by means of axial movements, thus being focused near infinity when close to the prisms as shown in FIG. 1. Axial movements prompted by such variable object distances and associated with a camera lens [OBJ] of focal length f=50 mm is further indicated by the following

TABLE #3

| Object distance focused at | Associated axial movement of a sensor |
|---|---|
| Infinity ∞ | 0 mm (millimeter) |
| 1 meter | 1 mm |
| 20 centimeters | 5 mm |
| 8 centimeters | 15 mm |

The sensors are moving away from the prisms in FIG. 1 when refocusing for proximity distance. In an effort to optimize the use of projected light through the objective lens, we have here chosen a system where either sensors or the optical finder is getting all the light: This is being effectuated by means of a movable mirror S3 (here shaped as a prism half), which is inserted into the ray path behind objective OBJ, when using the optical finder. Mirror S3 is here attached to the top of a movable beamsplitter prism RP and these two components RP and S3 are thus moving vertically together when changing inbetween the two modes of either optical finder or electronic finder & image registration. The beam is deviated vertically upwards to an image plane with a diffusive focal plate M inserted, and with the prism-assembly RP/S3 lowered according to the figure.

Figure 2:
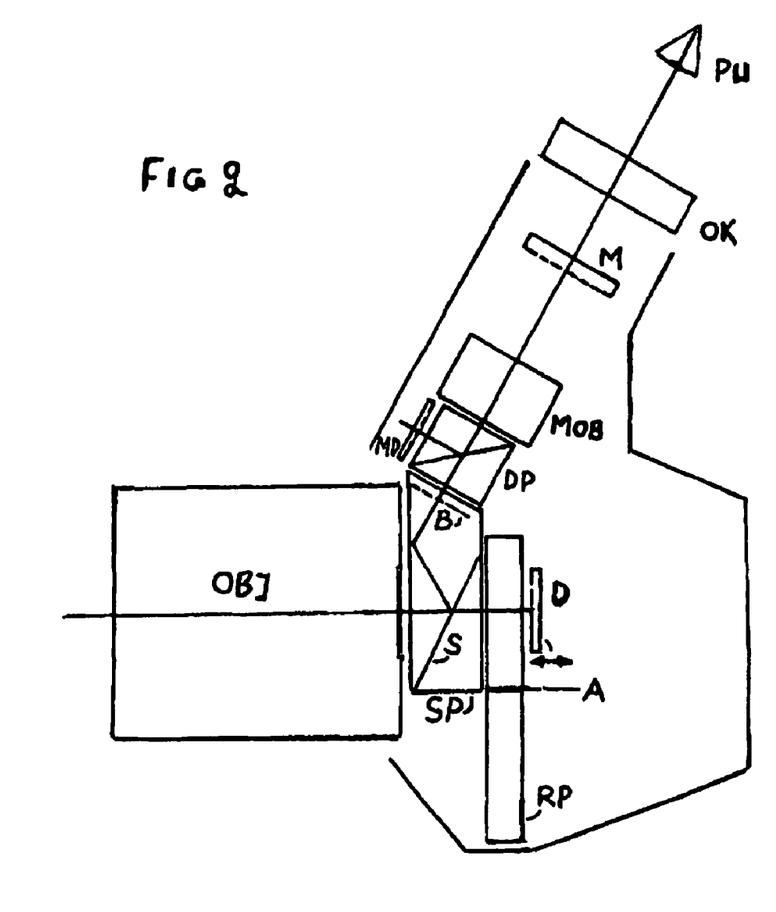
FIG. 2 shows another such camera.

This is consequently a finder-image being projected, corresponding to the detector-image planes, and furthermore magnified by means of a 'transport-lens' MOB, projecting onto an eyepiece image plane OB via mirror S1, creating an image of about same size as on the liquid crystal screen LCDB. The photographer may observe this image OB from the exit pupil position PU1, through the low-magnifying ocular OK, and the mirror S2 must then be folded to its upper position. He may instead observe the corresponding electronic picture LCDB when lowering mirror S2. The issue of using a common eyepiece for optical and electronic viewfinders has come up quite recently, i.e. whenever two such finders may occur together in a digital camera. The arrangement allows for ocular observation of the photographic scene, through both finders and without changing observation/pupil-position, this amounting to a practical feature. Only one eyepiece is furthermore required for magnifying two different pictures, which may be attractive from a cost- or design point of view, reducing size and weight. This arrangement with a common finder-eyepiece may advantageously be applied to many other kinds of electronic, so called digital cameras, with one optical and one electronic finder, where the aim is to magnify both images with a lens/ocular. (FIGS. 2 and 3 are illustrating this further). Mirror S2 is in fact folded into a removable lid (including the mirror) and this removal makes it feasible to watch the LCD image screen from above, constituting a classic mode, sometimes preferred by photographers. The picture LCDB will appear upside down when looking from above, however of little consequence here as the image may readily be turned the right way round again by electronic means. One mode of preference is to turn this image automatically when detaching the lid & mirror. Even the focusing screen M in the optical finder's ray path may be folded aside, giving a depth of field-extension to the optical finder, in fact functioning as a terrestrial telescope, as already described in this text. The mobile prism RP is displaced to a more central position inbetween the other beamsplitter prisms P1/P2 and objective OBJ, when switching from optical to electronic finder-view or image registration. Mirror S2 is at the same time automatically folded down, according to an attractive design, making the electronic image-screen visible through eyepiece OK. The whole 'other' beamsplit-assembly P1/P2 including its mobile sensors, is thus stationary and mechanically linked together, constituting a stable opto-mechanical unit. The images associated with D1 and D4 are inverted vs the corresponding pictures D2 and D3, however this is corrected by electronic means. The optical mirror-prism S3 answers to the flipping mirror of a single-lens reflex camera, which means that it's swiftly folded away while the photo is taken. We are instead having a vertical movement here of prism RP, however the vertical mechanical tolerances are not so critical since the subsequent beamsplit takes place horizontally. The camera is capable of performing electronic processing (not shown in the figure) of the differently-focused images, in order to present a depth of field-improved view via the electronic finder LCDB. A lens L2 for possible optical correction of beamsplitter/prism-aberrations is also suggested and other such corrective elements may be added as well (not shown).

The figure is also indicating a teleconverter TK, which may be attached at the front of the main lens OBJ. This is, according to a preferred design, an afocal zoom, making it possible to change the focal length. A stationary standard objective lens may protect the interior of a camera against moisture and dust, this being less important for the classic camera, where emulsion-film exchange is taking place all the time regardlessly, but more important for a digital camera, which is considerably more sensitive in this respect. A design following FIG. 1 having a fixed rather than exchangeable lens plus an afocal detachable zoom, is thus defacto preserving the feature of focal-length zooming while offering better protection as well. The lens OBJ must however give enough available free space inbetween rear lens surface at L1 and the image plane, this distance usually amounting to 40 millimeters or more for generally available single-lens reflex (24×36 mm) camera lenses. FIG. 1 is more of a principal character, though reasonable proportions were yet aimed at.

Even FIG. 2 is presenting an example of a video and/or still camera for improving depth of field, however with one image-sensor only, still featuring optical as well as electronic finders, both with depth of field-improvement capacity. Refocus of sensor D is, according to the figure, effectuated by means of a rotating plate RP, which may here consist of—say—three parts: Two plane and parallel glass-plate segments of different thickness plus one sector without glass: The camera may thus be refocused inbetween these three focal states when rotating the plate around its axis A. Axial and cyclic movements (vibration) of the detector D or some other internal process inside lens OBJ might also do the trick, referring again to the Swedish patent application 0004836-3, where all these techniques have been outlined, thus not to be dwelt on any more here. Such periodic refocusing will thus generate differently-focused images, which may form a basis for improving the depth of field for images being registered, as already described, plus at the same time generating, using same process and sensor, a corresponding depth of field-improved view at the micro-displayer MD, which can be observed from exit-pupil position PU, via the display-mirror-prism DP, magnified by the intermediate objective lens MOB and the ocular OK. The oblique-angle view from above may prove practical in cases where the photographer wishes to descend his camera, down to ground level, from where a depth of field-improved macro-perspective may look 'interesting'. The prism element DP may be replaced by a thin mirror, however whatever the actual arrangements may be, the mirror-element DP can be folded outside or be slided away from the beam (this latter in right-angle direction from the figure-plane). The camera suggested by FIG. 2 has a small sensor (about 6×8 mm), thus preferably working with 'video-size' lenses, where typical focal lengths are f=8 mm, f=16 mm or f=50 mm (long telephoto lens). These lenses have usually a relatively short free space inbetween rear lens surface and image, being a possible obstacle when attempting to insert a beamsplitter behind the lens. The beamsplitter SP chosen here, for the optical finder, has therefore an unusually short optical length (in transmission), due to an arrangement with 30-degree angles and a double internal reflection. The prism becomes even more useful by using low-weight high-index glass. This prism is thus reflecting away some of the light projected by lens OBJ, into the optical finder, where an intermediate image B of same size as at Sensor D is firstly created, thereafter being magnified to another ocular-image-plane, where a focusing screen M has been inserted in order to facilitate focusing through the optical finder, as already explained (above). The focusing screen can be folded or slided away, when using the optical finder in the depth of field mode (described above) or when observing the electronic finder-view at MD. The optical finder without focusing screen does then function as a so-called terrestrial telescope and it should be pointed out that this arrangement allows for more comfort than if the primary image plane is watched directly through an eyepiece (cf FIG. 3), because such an eyepiece must hare a shorter focal distance due to the small image size and thus a shorter eye relief, being an inconvenience when viewing. The image here, may be magnified instead, thanks to the optical 'transport system' MOB, making it possible to use a larger size ocular. The projected light is thus split inbetween optical viewer and detector D, by the beamsplit-film S of the stationary beamsplitter prism SP, this constituting an attractive procedure, because movable components are avoided. It's true that, as a consequence of this, the camera sensitivity will decrease while the finder view becomes slightly darker, however this trade-off may still be acceptable, because the camera has only one sensor D, so the light must not be further divided inbetween several detectors. The example of FIG. 2 is only meant to serve as a sketchy guidance as regards the principles involved, yet reasonable proportions were aimed at.

FIG. 3 is again exemplifying a camera with depth of field capability, this time a compact and sketch-oriented design, having bearing upon a compact video camera with still photo capacity, with two differently focused sensors D1 and D2 plus an optical viewfinder, where the eyepiece OK is this time focused upon one of the primary image planes (generated by beamsplitter-cube P) of the camera lens OBJ. The optical finder is thus coaxial with lens OBJ, having relatively small pupils and lacking focusing screen, thus offering considerable depth of field. The image of the electronic finder is generated by image-sensors D1 and D2, presenting a finder view at micro-displayer MD, which becomes visible through the eyepiece OK, as soon as the finder-prism SP is slided aside (vertically in FIG. 3), i.e. away from the beam. Electronic—as well as optical finder-views are hence created in the common primary ocular (OK) image plane. The photographer may now choose (by using an image-selector function) inbetween electronic finder-views from either detector D1 or D2 (for focusing), or a processed image aiming at extended depth of field, merged from D1 and D2 (for image composition). FIG. 3a shows the primary beamsplitter cube in some detail: It has three half-transparent mirrors R1, R2 and R3. The detectors D1, D2 and the optical viewer will thus get 25% each from the incident light while remaining 25% is lost due to reflection back through the lens again. The light at detector D1 has been transmitted through both mirrors R1 and R2, the light at detector D2 was reflected by mirror R1 and then transmitted by mirror R3. The light to the optical finder thus passing two optically equivalent ways as follows:

a/ R1(T)-R2(R)-R1(R) and out through free exit A (no mirror)
b/ R1(R)-R3(R)-R1(T) and out again through the free exit A where R is reflection and T is transmission Each of these contributions are thus 0,5×0,5×0,5=0,125 of total light intensity thus in total 2×0.125=0.25, being 25% of incident light. These two 'contributions' must of course be lined up carefully in order to avoid double-imaging, however probably not a big deal in this case because of solid physical integration of the beamsplitter-structure and furthermore short optical lengths.

An introduction of asymmetry (PA) in the beamsplitter ray-path (FIG. 3b) may introduce a (relative) focus-difference inbetween these two beam-parts of the optical finder, being an example of how two differently-focused images may be generated optically with a wavefront-split, subsequently being superposed again, the aim being to create a kind of optical average-image, thus improving the depth of field. It would be possible to slide out the prism P, replacing it with another beamsplitter PS, introducing at least one more image plane D3, for sequential registration of additional and differently-focused images (located in another figure-plane, just hinted at.).

Figures 4A, 4B:
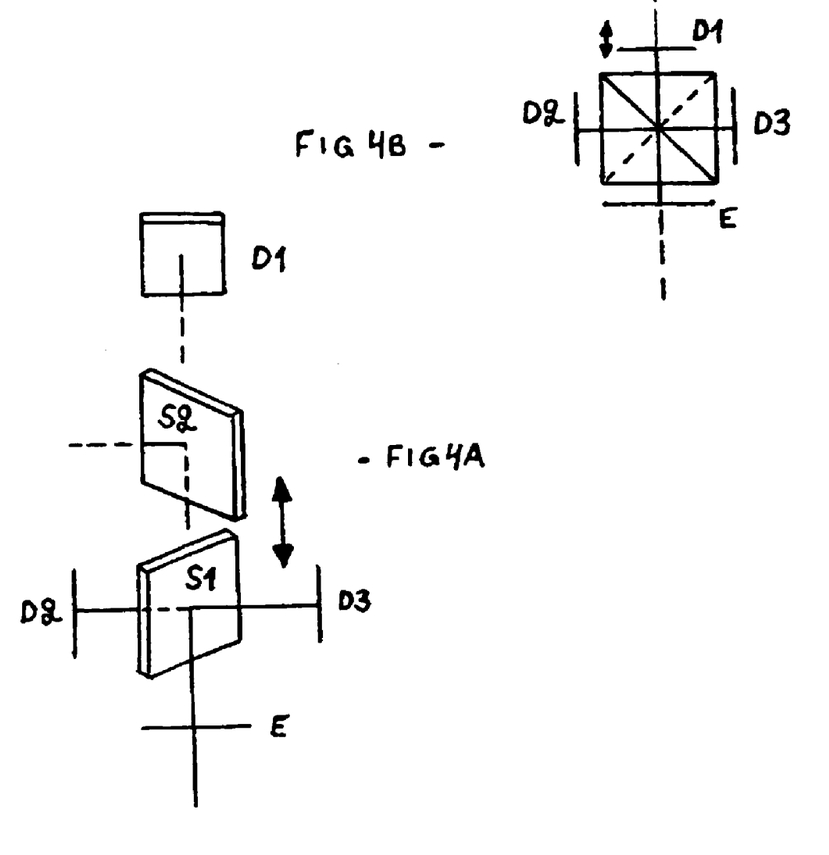
FIG. 4A-C shows another advantageous design with a beamsplitter of dynamic character at the moment of exposure.
Figure 4C:
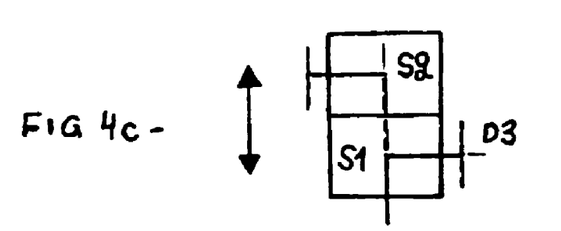

FIG. 4a shows a beamsplitter arrangement in perspective, with two vertically movable mirrors S1 and S2 and the three image detecting sensors D1, D2 and D3. The two mirrors are usually reflecting as well as transmitting and are, according to a design of preference, attached on top of each other in right angle. Incident light from the scene, which is to be photographed, is passing an objective lens with exit E, thereafter being transmitted by either mirror S1 or S2 and finally projected against the in-focus image plane of sensor D1, being continuously illuminated. Another part of the incident light beam is either deviated in right angle by mirror S1 against detector D3 to the right or by mirror S2 against the detector D2 to the left in the figure. A switch inbetween image detection at detector D2 respectively D3 may be effectuated by vertical movement of mirrors S1/S2. Axial movements of the three sensors D1, D2 and D3 may focus them differently and two differently-focused images may always be registered, either D1 and D3 or D1 and D2. According to a preferential video camera set-up, one of these sensors (like D1) will vibrate in an optional but for video purposes adapted frequency, this generating cyclic refocusing. Piezoelectric actuators exemplify the means to accomplish this, having the capability of vibrating several-gram-weight objects at frequencies exceeding 25 Hz and with amplitudes more than a millimeter, answering to an actual frequency of refocus. Anyone of these three detectors of FIG. 4a may be exchanged with the path of an optical finder. FIG. 4b shows the same beamsplitter system from above and FIG. 4c from the side. The three part-FIGS. 4a, b and c are thus exemplifying a beamsplitter system, essentially made up from two movable mirrors, accomplishing simultaneous registration of two differently focused images plus at least two sequential but differently focused images or several more of these, in case one of the image sensors is set into periodic vibration forth and back, as may be considered in a video recording application. Detector D1 may be eliminated if the mirrors are totally reflective, leaving the two detectors D2 and D3 for alternating and time-sequential image registration.

Another application example (FIG. 5) features sequential image-registration, using a commonly available digital still camera (CAM) adhering to prevalent techniques, with the normally associated functions like electronic viewfinder (LCD) with magnifying lens (LUP), objective with lens-components (L), image sensor (BS), image memory (CM) with an exit (EXP) for exporting pictures to a PC computer (where the depth of field-enhanced pictures are being processed). And furthermore an exposure-control, making photography in the so called C-mode feasible, implying rapid registration of an image-sequence, while keeping the exposure-knob (CK) depressed. High picture-frequency is aimed at: Current simple digital cameras can make about one shot a second in C-mode (Like Olympus Camedia C-3000) while more professional cameras (Like Canon D30) may produce 3 sequential pictures per second, or even more. The focus is controlled by means of a motion actuator, in this case a Focus-motor (FM) which, according to this example, is moving a Focus-lens (FL) forth and back along the optical axis of the camera objective (OBJ). A design of precedence, which is defacto transforming this standard-camera (prior art) into a depth of field-improving camera, is involving an electronic module EM for driving the focus-motor FM, the purpose of this being to refocus the lens according to the intentions of the photographer while a continuous mode of exposure is on. This concerns an automatic, programmed procedure, where the focus is usually set to preselected states during the intervals inbetween exposures. An example of such a course, involving 3 states of focus ('images') in continuous mode and about one picture/second goes as follows:

TABLE 4

Figure 5:
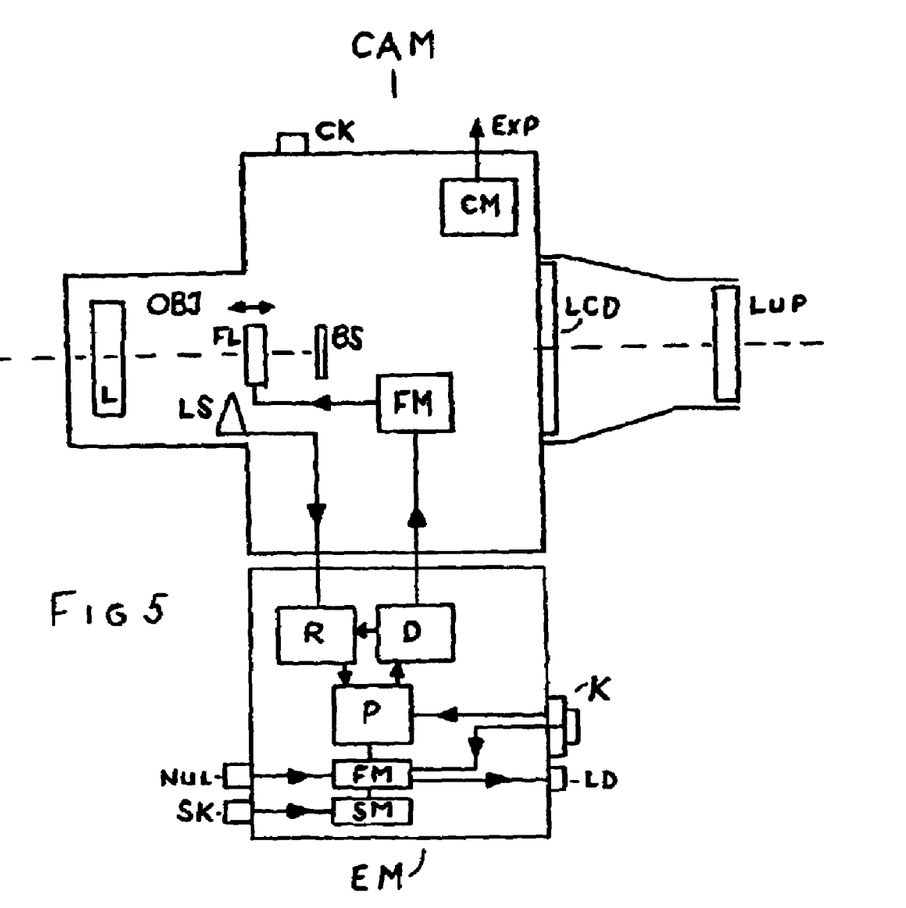
FIG. 5 depicts a common digital still camera, being modified in order to produce depth of field-improved photos.

| Time lapse | Event |
| --- | --- |
| 0 second | First frame exposed at starting position #1 |
| 0–1 | Refocus to focal position #2 - then standstill there |
| 1 | Exposure of the second frame |
| 1–2 | Refocus to focal position #3 - then standstill |
| 2 | Exposure of the third frame |
| 2– | Refocus to Starting position #1 again |

Continuous Autofocus-mode photography is a common feature nowadays, however does not allow for controlled preselection of focusing ranges—therefore being of little relevance to our application. It may (typically) take 0,2 second to refocus, making the rest-time for each state of focus about 1−0,2=0,8 second in this case. Exposure times are typically shorter—like 1/125 sec in this example. Firstly, this gives 'plenty of time' for the camera to expose inbetween refocusings, and secondly, the individual pictures will not suffer from more movement-blur than at 'normal' photography with single shots. However an object in view might still move considerably inbetween two shots: Minor fast-moving objects with unambiguous states of focus, belonging to just one of these differently-focused original exposures will often show up without appreciable blur or other disturbances, after segment-related image processing. Discrimination or enhancement of mobile objects, after some motion-vector analysis, constitutes a further improvement-potential. However the present example of a depth of field-improving camera is best fit for photography of semi-stationary scenes like still lifes and landscapes. An increase of frame-frequency to about 3 or 10 exposures per second should make it increasingly possible to master more mobile scenes, like people sitting at a press conference. Pictures are thus taken of the same motive but differently focused, constituting a necessary basis for electronic image processing and production of depth of field-improved pictures as already described: However the image processing is not taking place inside the standard camera according to this example (FIG. 5) but by using program-software in a separate PC computer, located somewhere else. The photographer may always relapse into a defacto 'traditional' one-exposure mode, using individual original exposures in incurring cases of abortive depth of field-processing. The state of focus, i.e. position of the focusing-lens (FL) is controlled by at least one position-sensor (LS) and/or by means of so called 'dead reckoning' within the operative object-range interval chosen, involving registration and feedback to the electronic module (EM) about movements of the same lens. (FM) may for example be a step-motor, run on pulses from an electronic driver-circuit (D) while the movement-registrator is composed of an electronic counter (R), counting the plus/minus number of 'steps', which the motor is driving the focusing with, in a direction against or away from a calibrated focus-position, being determined by a Position-sensor (LS). The System-processor (P) is aided by this kind of information when converging the focus into a requested position or state. This and many other alternative arrangements involving other motions-sensors (Like for USM-motors, Piezoelectric actuators etc) and other positional sensors (like mechanical, optical and electronic terminus-, rotation- or calibration-sensors) belong to prior art. An analogous displacement of the image sensor(s) (BS) or other lenses in objective OBJ may also do the trick, instead of moving the rear lens (FL). The module EM, being in control of this continuous-mode refocusing is, according to FIG. 5, located outside the existing standard camera-body, emphasizing a distinction inbetween this depth of field-extending camera and a standard digital camera. However, this module EM might as well be integrated inside the digital camera. The standard (CAM) digital camera (Like Olympus Camedia C-3000) and electronic module EM are, according to FIG. 5, defining a depth of field-improving camera, with sequential refocusing. The lens OBJ may be detachable and furthermore supplied with a focusing motor and electronics of it's own (like for objectives compatible to the Canon D30 camera), thus making it analogously possible to drive this lens by an electronic module EM. However such a separate and detachable lens can only register images when interacting with a camera-housing and may thus nevertheless and under these circumstances, be regarded as an operational part of a camera, thus by definition included in the application-example described.

A prerequisite of this automated focusing procedure, synchronized with an ongoing continuous exposure-mode, is that the focal states were selected in advance. It has already been described how an operator may choose inbetween various preselection-modes like Manual focusing, Proximity-bracketing, interval-bracketing and Standard focusing, involving various levels of automation, A fast manual focusing-mode with advantageous user-ergonomics may be used in the example of FIG. 5, as follows: The depth of field-improving camera has a two-step shutter release knob (K) with at least the following three functions:

Focus-registration

Picture-number selection

Exposure

Two-step knob (K) means that it can be pressed down to two different, distinct activation-levels. This is normal for cameras (prior art), where the camera electronics is activated when pressing (K) half-way (The normal intermittent Autofocus mode becoming activated) and exposure for a picture takes place when pressing the same knob down to the bottom. The distinctive feature of the depth of field-extending camera of FIG. 5 is that registration and saving of current state of focus, into an electronic memory (FM), is taking place at the moment when the knob is depressed half-way. Registerable information about this state of focus, originating from position-sensor(s), counters etc have already been outlined (above). Other focal states can be saved by repeating this procedure, i.e. priority-selection of sets of focuses may continue until all memory capacity of the system has been fully utilized. A focus-indicator, like the light-emitting diode (LD), is lit whenever a state of focus is activated: The number of diodes being lit, will thus disclose the number of pictures in a focusing-sequence. This sequential preselection and memorization of focal states is usually preceded by manual- (MF) or Auto (AF)-focusing against objects within the scene to be photographed, i.e. objects being alloted priority by the photographer, and being predestined for optimal image definition. The photographer has the option to either set manually for best image resolution, as appearing in the viewfinder, or set for specific numeric ranges on a designated range-scale, designed for this purpose. An operator changing his mind, may press the Reset-knob (NUL) which restores/nullifies the focus-memory (FM). Light-diodes (LD) are then turned off and it's then possible to start from scratch again with the focusing. This reset may also be effectuated by twisting a universal knob (K). A number of such memorized focuses, meant for a continuous-mode sequence, constitutes by definition a 'set' of focal states. Such sets may be memorized in a specially designated memory (SM) for later requisite and be brought up again (by a Focus-retrieval contrivance) by using additional knob(s) SK. Such a procedure may prove practical when repeating the photography of a specific scene—without the unnecessary repetition of time-wasting refocusing. The photographer, having depressed the knob K half-way (thus saving a focus), has each time the option to either release the knob or complete the pressing, this latter triggering off exposure of the number of shots answering to the focuses being saved in memory (FM). The electronic module EM will then drive the Focus motor (following the principles outlined above), to each memorized state of focus, where image registration is subsequently taking place. This process is controlled by a computer-program associated with the microprocessor (P), which determines order of priority, refocus-speed, time of standstill at respective focus etc. The knob (K) is thus functioning as a Focus-registrar when (1) pressing down half-way, then as a picture-number selector and exposure-trigger at the moment (2) of pressing down completely. The entire course of events from focus-selection until finished exposures thus being controlled with one knob only and without change of grip, supposedly making a camera easier to handle. However, any specialist may readily appreciate the fact that the configuration/layout of knobs, signal-lamps etc may vary indefinitely. Light-emitting diodes may be replaced with numeric symbols on a LCD-display while the universal-knob (K) may be replaced with separate knobs or other controls, using one for each individual function and in variating combinations. It would for instance be feasible to control each single focus-memory with an individual knob: We are here talking about minor variations around a main theme.

The existence of adequate procedures for memorizing states of focus and a device for automatic refocus of a camera, while sequential image registration takes place, are essentialities however.

FIG. 5 is schematic and simplified, i.e. shows only certain details which are relevant for the discussion above, neither pretending to be in scale nor showing the complete electronic set-up.

What is claimed is:

1. A digital camera with lens for depicting a scene being composed of objects within a field of view, at various object-distances in front of said objective, a focus-selector and a focusing device for setting the focus of the camera at different distances, at least one electronic image detector with entrance plane for detection and register of image information answering to an image of the scene being depicted, plus an associated image-sharpness detector, wherein
   a) said focusing device being arranged for simultaneous focusing of this instrument at different object-distances, and/or a time-sequential focusing procedure is being used,
   b) an image detection being arranged in such a way that image information equivalent to at least two differently-focused images, i.e. with mutually different states of focus and depicting the same scene, are detected,
   c) means being allocated for letting said image-sharpness detector, directly or indirectly and from each such set of corresponding differently-focused images, select/extract and forward such components/parts of the image information, which contribute to the most optimal picture definition and let this said selected image information from the same set of mutually corresponding pictures, merge into a final image with better resolution than the differently-focused images detected individually, and
   d) means being arranged for selecting individual focus-distances, using said focus-selector, answering to at least one of said differently-focused images, this constituting an optional pre-selection of individual states of focus, before image registration takes place;
wherein
   the camera is furnished with a focus-registrar contrivance and at least one focus-memory, wherein means are arranged for registration of single states of focus as well as sets of such priority-states and furthermore forward such information to said memory for saving.

2. The camera of claim 1, in continuous mode, i.e. with capacity to perform a swift time-sequential succession of exposures and further means being allotted to control and drive said focusing device by using an electronic driver-module, wherein means are arranged for automatic setting of the camera focus at said pre-selected states of focus, while image detection, i.e. said exposures, are going on.

3. The camera of claim 1, and with additional motion-sensor, calibrated counter and electronic processor, wherein means are arranged for said driver-module to electrically drive the transport of such optical elements or image-sensors, being primarily responsible for refocus and that said calibrated counter is arranged for registration of current location of said focusing elements and that this information is interacting with the processor in a procedure of converging said motion towards a required state of focus.

4. The camera of claim 1, furnished with a focus-retrieval contrivance, wherein means are provided for selecting and retrieving information from said focus-memory, this information constituting registered sets about focal states or parts thereof, i.e. in-data for controlling said focusing device.

5. The camera of claim 1, and provided with a focus-indicator, wherein means are pre-arranged for visual indication of state of focus, being registered in said memory.

6. The camera of claim 1, with a nullifier contrivance, wherein means are adopted for an electronic reset of said focus-memory, constituting an erasure of said registered states of focus.

7. The camera of claim 1, with an interval-selector contrivance, wherein means are arranged for selecting at least one operational object-distance interval, corresponding to the focusing interval within which image detection is arranged to take place.

8. The camera of claim 7, and provided with an electronic image blur-function wherein means are arranged for defocusing image-parts outside said object-distance intervals by using said blur-function, or replace said image parts with some other picture.

9. The camera of claim 1, wherein means are arranged for automatic setting of said differently-focused images, following a programmed, pre-selected scheme for focus-distances, the preferable distribution of these being optimally even, from a depth of field-standpoint, and this constituting a set of standard focuses.

10. The camera of claim 1, and furnished with a proximity-selector contrivance, wherein means are allotted for setting the nearest focus-distance allowed during image-detection, and this being controllable with said proximity-selector, and said procedure constituting an optional pre-selection.

11. The camera of claim 1, having optimal-focus-selector and depth of field-selector contrivances, wherein means are arranged for selecting and focusing within the field of view with said focus-selector, on at least one object or distance of preference, for optimal image resolution and to furthermore set the depth of field-selector for an object-distance interval of priority, within which depth of field-improvement is being arranged and this said interval being located in front of and/or behind said object/distance of preference.

12. The camera of claim 1, and with more than one image-sensor, wherein means are arranged for electrical connection in between sensors in order to accomplish a common read-out.

13. The camera of claim 1, wherein said camera-objective comprises a permanently attached lens on the camera plus means being allotted for attachment of a detachable afocal add-on lens with fixed or variable magnification.

14. The camera of claim 1, wherein an image-sensor of the camera having at least two mutually in parallel detector planes and that these surfaces are separated in order to register differently-focused images, one at each such plane.

15. The camera of claim 1, wherein means are allocated for said selection extraction of image information by using said image-sharpness detector and by utilizing a template- or image-comparison technique, and where said image-registration for respective final image and template image are independent, separate recordings and at least one of the camera settings like exposure-time, aperture size, focal length and image sensor-sensitivity differ in between these two separate registrations.

* * * * *